June 10, 1924.

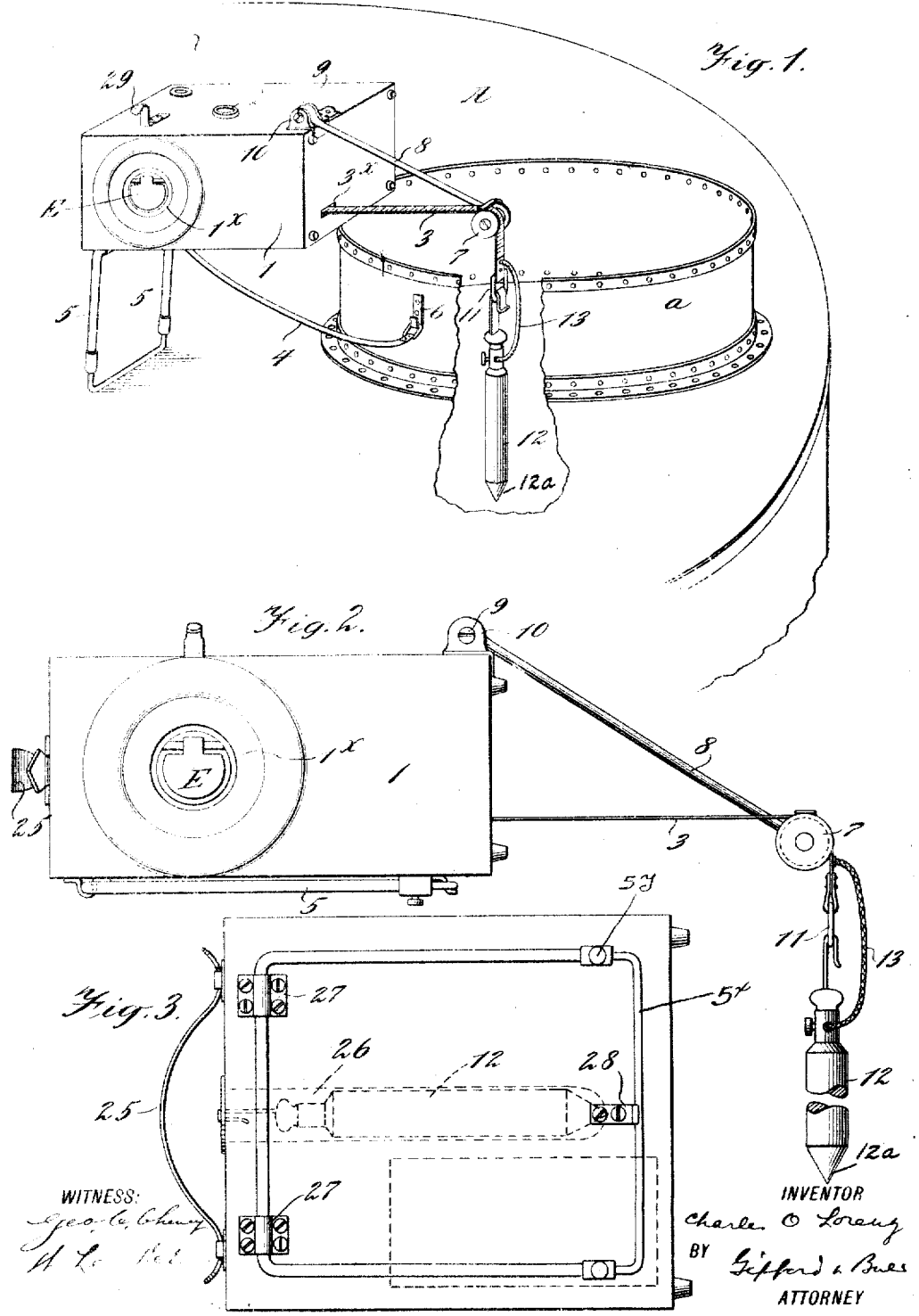

C. O. LORENZ 1,497,178

ELECTRIC LEVEL INDICATOR FOR LIQUIDS

Filed July 20, 1917   2 Sheets-Sheet 2

INVENTOR
Charles O. Lorenz
BY
ATTORNEY

Patented June 10, 1924.

1,497,178

UNITED STATES PATENT OFFICE.

CHARLES O. LORENZ, OF PORT ARTHUR, TEXAS, ASSIGNOR TO THE TEXAS COMPANY, OF NEW YORK, N. Y., A CORPORATION OF TEXAS.

ELECTRIC LEVEL INDICATOR FOR LIQUIDS.

Application filed July 20, 1917. Serial No. 181,863.

*To all whom it may concern:*

Be it known that I, CHARLES O. LORENZ, a citizen of the United States, residing at Port Arthur, in the county of Jefferson and State of Texas, have invented new and useful Improvements in Electric Level Indicators for Liquids, of which the following is a specification.

My invention relates to measuring apparatus for gaging the depth of stratified liquids and has for one object to provide a simple and improved instrument that shall be portable and especially adapted to accurately gage the water and the oil in oil storage tanks.

In practice when oil is stored in tanks, it is common to have varying quantities of water resting in a distinct stratum in the bottom of the tank, the separation being established and maintained by reason of the difference in the specific gravities of the liquids. While my invention is particularly designed and adapted for determining the water level in oil tanks, it is suitable for gaging any liquids lying in strata which differ in electrical conductivity.

According to my invention, I employ a graduated metal gage line, with a terminal or contact weight at its outer end, a galvanometer or other equivalent indicator, and a suitable source of electrical energy, such as a battery mounted in a portable case, one terminal of the galvanometer circuit being connected generally to the liquid to be gaged, as for example, by connecting it to the tank in which the liquid is contained, if it is metal; the other terminal of the circuit being connected through the galvanometer and the metallic gage line. The arrangement is such that the circuit is completed through the liquid as soon as the gage line comes in contact with the surface and the extent of galvanometer deflection indicates the change from a liquid of one conductivity to a liquid of a greater or less conductivity.

Other objects and advantages of my invention will be set forth hereinafter, and I will now describe the same with reference to the drawings and point out the novel features thereof in the appended claims.

Referring to the drawings:

Figure 1 is a perspective view of the tank gaging apparatus of my invention, illustrating its use for determining the level of liquids contained in a metal tank.

Figure 2 is a side elevation of the gaging apparatus with the foot support in the folded position.

Figure 3 is a bottom plan view.

Figure 4:
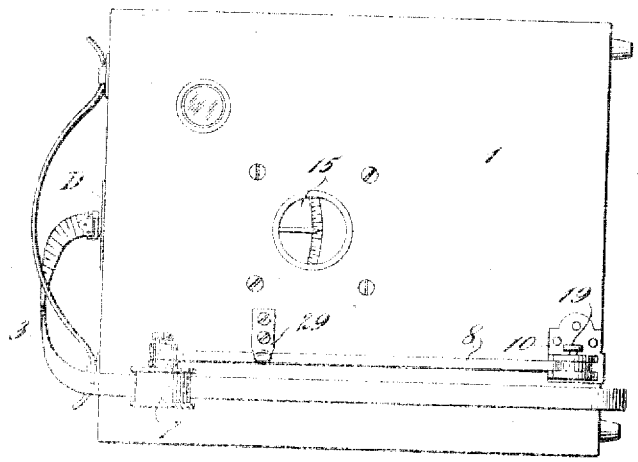
Figure 4 is a top view, and Figure 5 an end elevation of the apparatus folded ready to be transported.

Referring to Fig. 1 it will be seen that the apparatus consists of a galvanometer casing 1 provided with an indicator dial 2, a circuit through the galvanometer (not shown) being effected by an electrical connection between the metallic gauge line conductor 3 and the conductor 4. In the said figure the apparatus is shown as it appears when in operation on a roof of a metal tank A, the instrument case resting at one end upon the edge of hatch $a$, and being provided at its opposite end with the adjustable supporting legs 5. Attached to the hatch is a metal clip 6, made preferably of some non-rusting substance as brass; and the conductor 4 is hooked to the said clip. The gauge line 3 emerging from the instrument case through a suitable slot $3^x$ passes over a roller 7 at the end of a supporting rod 8 pivoted at 9 upon a bracket 10 secured to the top of the instrument case. At its outer end the gauge line is provided with a loop 11 into which is hooked the upper end of the weight 12 which acts by gravity to pay out the conductor 3 when the latter is released at the instrument. The weight 12 is also connected to the gauge line by means of a small contact wire 13. The weight 12 may, if desired, be equipped with a steel point $12^a$.

Figure 6:
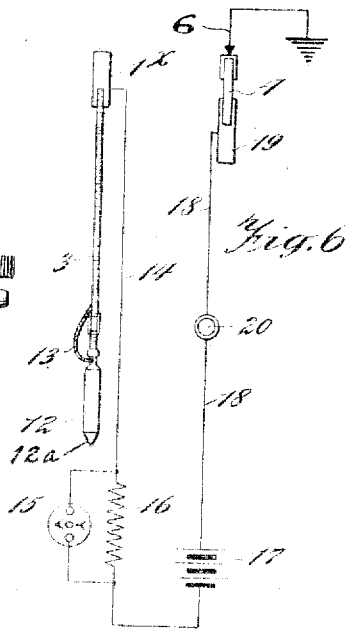
Figure 6 is a wiring diagram showing the circuit connections of the device of the preceding figures.
Figure 5:
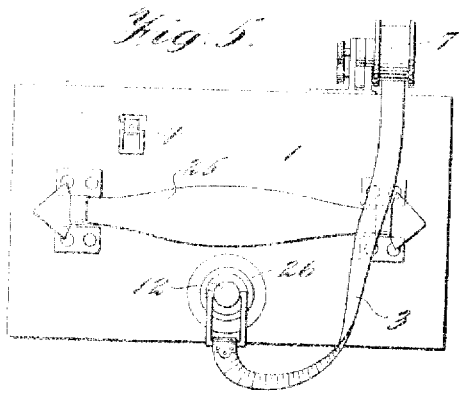

In the wiring diagram of Fig. 6. $1^x$ indicates the gauge line case, connected by a wire 14 to a sensitive galvanometer 15, which is provided with an appropriate shunt resistance 16. It is sometimes preferable to use a series resistance in place of this shunt. The current for the circuit is furnished by the batteries 17 which are connected by wire 18 to a case 19, encasing conductor line 4 and electrically connected therewith.

In the diagram 20 indicates a push button switch, and when this switch is closed and the weight 12 is in contact with a liquid conductor within the tank, a complete circuit for the electrical current is formed from the battery 17, through the parallel consisting of galvanometer 15 and shunt 16, through wire 14, through gauge line case 1ˣ, through gauge line 3 and wire 13, through weight 12, to the liquid conductor, through the metal tank and clip 6 to conductor 4, through case 19 and wire 18, back to the batteries 17.

Figure 9:
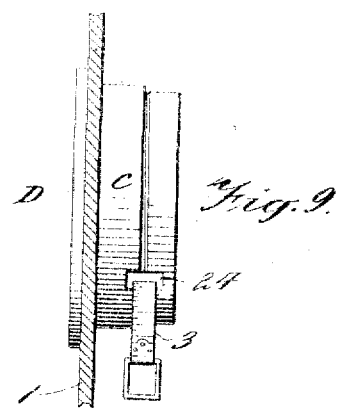
Figure 7:
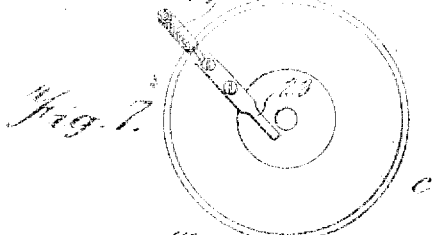
Figure 7 is a plan view.
Figure 8:
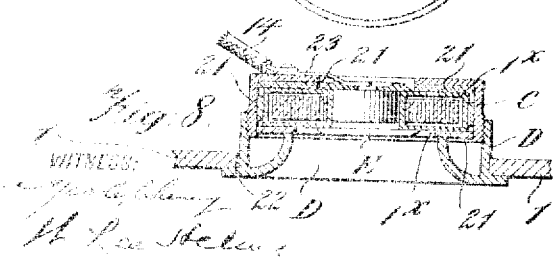
Figure 8 is a sectional elevation, and Figure 9 an end elevation of the spool on which the gage line is wound, illustrating how it is connected in circuit electrically and how it is secured mechanically in position within the instrument case.

If the weight 12 be drawn out of the water or other liquid conductor, and be drawn into the liquid insulator, such as oil, the circuit is broken, as indicated by the galvanometer needle. Or if the weight be drawn into another liquid which is not an insulator, but which differs in conductivity from the first, the presence of such liquid conductor is noted by an increased or decreased deflection of the galvanometer needle. The gauge line case 1ˣ is secured in position within the container C, and is insulated therefrom by means of the insulation 21. The container C is threaded within a bracket cup D, frictionally held in the aperture 22 formed in the instrument case 1. The gauge line case is provided with a contact 23 to which is electrically connected the wire 14; and, as above pointed out, the case is electrically connected with the gauge line which it encloses. The case 1ˣ is provided with an opening (not shown) in register with an opening 24 formed in container C for the passage of the gauge line 3, as shown in Fig. 9. It will be understood without further explanation that the case 1ˣ may be axially rotated and the gauge line may be payed out, or reeled in, by means of the pivoted thumb piece E.

The instrument case may be provided with a carrying handle 25, and also with a socket 26 into which the weight 12 may be placed when the instrument is not in use. The legs 5 are provided with a telescoping extension 5ʸ which may be adjusted and held in position by set screws 5ʸ to correspond in height to the hatch A. The are pivotally connected to the case by means of the brackets 27, and therefore may be moved against the bottom of the case and held in position by clip 28. The supporting rod 3 also may be moved back against the top of the case, so that its outer end may be held by clip 29.

There are various ways in which the device which constitutes the subject matter of my invention may be used to gage or determine the liquid levels of stratified liquids.

Thus in one mode of operation in determining, for example the respective levels of oil and water in a tank, the operator pays out the gage line 3 until he feels the weight 12 touch the bottom of the tank. It is apparent that the indication on the gage line, that is, the oil meniscus on the line, shows the upper oil level and thus indicates the total height of the oil and water. The presence of the water in the bottom of the tank operates to establish electrical connection between the line 3, including contact member 12, and the metal wall of the tank and contact member 4, so that when the push button 20 is operated a circuit is closed from the source of power 17 and through the indicator 15. The deflection of the needle of the instrument 15, due to the passage of current through the circuit, indicates the presence of the water. The operator then reels in the gage line 3 until he observes that the galvanometer needle has returned to zero which indicates that the circuit has been broken by reason of the contact member 12 having been drawn out of the water into the oil. The operator observes the reading on the gage line at this point and it is apparent that the new reading shows the depth of the oil strata and that the difference between the first and second readings indicates the depth of the water.

The tank gager may use the instrument in other ways to secure the same result; for example, he may pay out the graduated gage line into the liquid and read the depth on the gage line when he first gets a considerable deflection of the needle caused by the point of the weight coming in contact with the surface of the water below the oil. This gives him the depth of oil in the tank. He can then gage the full depth of liquid in the tank in the usual manner, by lowering the weight until it touches the bottom. This will be indicated both by the "feel" of the gage line and also by the wider deflection of the galvanometer.

By my apparatus it is possible to ascertain the water level with a very high degree of accuracy, a very slight film of oil separating the point 12ᵃ from the water being sufficient to insulate the weight 12 so as to break the current.

In the use of my invention it is not necessary that the liquids gauged should differ in electrical conductivity to the extent that one is an insulator and the other a conductor. Any number of liquid conductors lying in strata may be gauged provided only they vary in electrical conductivity. For example, crude oil, lubricating distillates and other oils are often heavily impregnated with water or moisture to such an extent that they are capable of acting as conductors of an electrical current, and when the weight 11 is plunged in such an oil the deflection of the galvanometer needle indicates the presence of an electric current. But the deflection is not as great as when the weight 11 comes in contact with the actual water body, the point of change in deflection of the needle denoting the line of demarcation between the water and the oil.

When the apparatus is used in gauging liquids which are not stored in metal tanks the electrical connection between tape line 3 and the liquid conductor may be made in any suitable manner as by hooking the conductor line 4 to a metal rod in contact with the liquids.

The connection between the conductor 4 and the liquid in the tank, whether established through the metal tank itself or through the rod, as just described, is referred to for convenience as a "general" connection, or that the contact is connected generally to the liquid.

The device of my invention is particularly simple and compact; it is adapted to be carried by the gager from tank to tank as he travels through the tank farm, and, moreover, it does not depend on any indirect indication for the measurement of the depth of the liquid, the gage line being graduated from the point of the weight so that the gage line itself constitutes a mechanical means for gaging the depth of the liquid in the tank without reference to the electrical indicator which is for the purpose of not measuring the depth, but indicating the division line between liquids or the bottom of any liquid stratum.

While my apparatus is primarily intended for, and is described herein as applied to, the determination of liquid levels, it is understood that I claim herein the substantial elements of my invention regardless of the use to which it may be put. It will be apparent to those skilled in the art that at times in the use of my apparatus a solid conductor may become the equivalent of a liquid conductor. For example, when determining the height of towers or bridges, or the depth of wells, the ground may take the place of a liquid conductor.

While I have shown in detail the various elements of my apparatus, for the purpose of demonstrating its method of operation, it is apparent that mechanical variations may be made therein without departing from the principle of the invention.

What I claim and desire to secure by Letters Patent of the United States, is:—

1. A portable tank gaging instrument comprising a casing, an electrically actuated indicator mounted in said casing, a graduated flexible electric measuring line conductor connected to one terminal of the indicator and having a contact member adapted to engage the surface of the liquid to be measured, and means for connecting generally the opposite terminal of the indicator with the liquid to be gaged.

2. A portable tank gaging instrument comprising a casing, an electrically actuated indicator mounted in said casing, a graduated flexible electric measuring line conductor connected to one terminal of the indicator, a reel for the conductor, an electrical contact weight at the outer end of the conductor adapted to engage the surface of the liquid to be measured, and means for connecting generally the opposite terminal of the indicator with the liquid to be gaged.

3. A portable tank gaging instrument comprising a casing, an electrically actuated indicator mounted in said casing, a graduated flexible electric measuring line conductor connected to one terminal of the indicator, a reel for the conductor, an electrical contact weight at the outer end of the conductor adapted to engage the surface of the liquid to be measured, a guide pulley for the measuring line conductor, and means for connecting generally the opposite terminal of the indicator with the liquid to be gaged.

4. A portable tank gaging instrument comprising a casing, an electrically actuated indicator mounted in said casing, an extensible support for the instrument, a graduated flexible electric measuring line conductor connected to one terminal of the indicator, a reel for the conductor, an electrical contact weight at the outer end of the conductor adapted to engage the surface of the liquid to be measured, a guide pulley for the measuring line conductor, a support for said guide pulley pivotally mounted on the casing, and means for connecting generally the opposite terminal of the indicator with the liquid to be gaged.

5. A portable tank gaging instrument comprising a casing, an electrically actuated indicator therein, a graduated flexible electric measuring line conductor connected to one terminal of the indicator, a reel within the casing for the measuring line conductor, a guide pulley mounted on a bracket pivotally attached to the casing and a conductor connected to the opposite terminal of the indicator and adapted to be connected to a tank to be gaged.

6. A portable tank gaging instrument comprising a casing, an electrically actuated indicator therein, a graduated flexible electric measuring line conductor connected to one terminal of the indicator, a reel within the casing for the measuring line conductor, an electrical contact weight at the outer end of the measuring line adapted to engage the surface of the liquid to be measured, a guide pulley for the measuring line conductor, a movable bracket attached to the casing and adapted to support said guide pulley, and a conductor connected to the opposite terminal of the indicator and adapted to be connected to a tank to be gaged.

7. A portable electric tank gaging instrument comprising an electrically actuated indicator having one terminal conductor adapted to be connected generally with the liquid to be gaged and having another terminal conductor consisting of a graduated flexible electric measuring line, a casing for the instrument, a reel within the casing for the measuring line conductor, an electrical contact weight at the outer end of the measuring line adapted to engage the surface of the liquid to be measured, a guide pulley for the measuring line, a supporting arm for the pulley, pivotally attached to the casing, and an extensible foot or support for the casing.

8. A portable electric tank gaging instrument comprising an electrically actuated indicator having one terminal conductor adapted to be connected generally with the liquid to be gaged and having another terminal conductor consisting of a graduated flexible electric measuring line, a casing for the instrument, a reel within the casing for the measuring line conductor, an electrical contact weight at the outer end of the measuring line adapted to engage the surface of the liquid to be measured, a guide pulley for the measuring line pivotally attached to the casing, an extensible support for the casing, pivotally mounted thereto.

9. In a device for measuring the respective levels of liquids lying in strata and differing in electrical conductivity, an electrically actuated indicator having a conductor connected to one of its terminals and adapted to be connected generally to one of the liquid stratum, and a graduated metal gage line connected to the other terminal of said indicator and adapted to engage the surface of said liquid stratum.

10. A device for measuring the respective levels of liquid lying in strata and differing in electrical conductivity comprising an electrically actuated indicator and electrical conductors connected to opposite terminals of said indicator, one of said conductors being graduated to constitute a measuring line and arranged to be paid out from said indicator into contact with said liquid strata.

11. In a device for measuring the respective levels of liquids lying in strata differing in electrical conductivity, an electrically actuated indicator, a conductor connected to one of the terminals of said indicator and adapted to be connected to the liquid strata so that a conductor stratum may be placed in circuit with said indicator, and a graduated metal gage line connected to the other terminal of said indicator and arranged to be paid out into contact with the liquid strata.

12. In a device for measuring the respective levels of liquids lying in strata of varying electrical conductivities and contained in metallic receptacles, an electrically actuated indicator, a conductor connected to one of the terminals of said indicator and adapted to be grounded on said metallic receptacle and a flexible conductor connected to the other terminal of said indicator and arranged to be paid out from the indicator into contact with the liquid strata, said flexible conductor being graduated to constitute a depth measuring line.

In testimony whereof I have hereunto signed my name in the presence of two subscribing witnesses.

CHARLES O. LORENZ.

Witnesses:
J. H. STEEN,
R. J. SINGLETON.